United States Patent
Hashimoto et al.

[11] Patent Number: 5,728,292
[45] Date of Patent: Mar. 17, 1998

[54] FILTER FOR IN-TANK FUEL PUMP

[75] Inventors: Takashi Hashimoto, Isehara; Yuichi Fujinuma, Zama, both of Japan

[73] Assignee: Nissan Motor Co., Ltd., Yokohama, Japan

[21] Appl. No.: 704,275

[22] Filed: Aug. 28, 1996

Related U.S. Application Data

[62] Division of Ser. No. 330,082, Oct. 26, 1994, Pat. No. 5,584,988.

[30] Foreign Application Priority Data

Nov. 11, 1993 [JP] Japan ................... 5-282186
Mar. 4, 1994 [JP] Japan ................... 6-34389

[51] Int. Cl.[6] ........................................ B01D 35/02
[52] U.S. Cl. ............... 210/136; 210/188; 210/316; 210/317; 210/346; 210/461; 210/472; 210/487; 210/499
[58] Field of Search ........................ 210/172, 188, 210/315–318, 342, 346, 416.4, 461, 472, 486, 487, 493.3, 493.5, 499; 96/155, 189, 219

[56] References Cited

U.S. PATENT DOCUMENTS

| | | | |
|---|---|---|---|
| 1,836,269 | 12/1931 | McKenzie | 210/172 |
| 3,165,473 | 1/1965 | Pall et al. | 210/493.5 |
| 5,049,267 | 9/1991 | Sasaki et al. | 210/172 |
| 5,186,152 | 2/1993 | Cortochiato et al. | 123/514 |

FOREIGN PATENT DOCUMENTS

| | | |
|---|---|---|
| 61-91067 | 6/1986 | Japan . |
| 62-197789 | 12/1987 | Japan . |

*Primary Examiner*—Matthew O. Savage
*Attorney, Agent, or Firm*—Foley & Lardner

[57] ABSTRACT

A filter is provided for use with an in-tank fuel pump for an internal combustion engine. The filter is disposed within a fuel tank and includes a main filtration chamber connected to an inlet of the fuel pump and a return fuel chamber connected to the engine for introducing thereto return fuel from the engine. The main filtration chamber has an upper side peripheral wall formed from a meshed filter medium. The return fuel chamber is connected to the main filtration chamber in such a manner that the upper side peripheral wall of the main filtration chamber serves as a partition wall between the main filtration chamber and the return fuel chamber. In one embodiment, the return fuel chamber has a peripheral wall formed from sheet or plate impermeable to fluid. In another embodiment, the return fuel chamber has a peripheral wall formed from a meshed filter medium, the meshes of which are smaller than the meshes of the meshed filter medium from which the upper side peripheral wall of the main filtration chamber is formed.

6 Claims, 7 Drawing Sheets

FILTER FOR IN-TANK FUEL PUMP

This application is a division of application Ser. No. 08/330,082, filed Oct. 26, 1994, now U.S. Pat. No. 5,584,988.

BACKGROUND OF THE INVENTION

1. Field of the Invention

The present invention relates to a filter for an in-tank or tank-mounted fuel pump (i.e., an electric fuel pump of the type for installation inside a fuel tank) for a vehicle such as an automobile.

2. Disclosure Information

As is well known, a fuel tank for a vehicle is constructed such that excess fuel from the engine is returned to the fuel tank through a return pipe. Since the temperature of the return fuel is higher than that of the fuel within the fuel tank, the return fuel from the engine causes the temperature inside the fuel tank to rise, resulting in a tendency to increase the amount of vaporized fuel within the fuel tank.

Thus, it is desirable to introduce the return fuel to the inlet of the fuel pump directly. However, if the return fuel is directly returned to the engine, the engine is affected by the return fuel and deteriorates in performance characteristics since the return fuel is mixed with vapor.

As disclosed in JU-A-61-91067 (publication of Japanese Utility Model application before examination) and JU-A-62-197789, it is known to draw through a return pipe, the return fuel having been returned to the fuel tank, into the filter connected to the inlet of the fuel pump.

However, though the return fuel is adapted to be drawn into the filter through the return pipe, it is difficult to separate the vapor from the return fuel completely, so that the return fuel mixed with vapor is taken into the inlet of the fuel pump as it stands and returned to the engine.

SUMMARY OF THE INVENTION

According to an aspect of the present invention, there is provided a filter for an in-tank fuel pump for an internal combustion engine, which comprises a main filtration chamber connected to an inlet of the fuel pump and having an upper side peripheral wall formed from a meshed filter medium, a return fuel chamber connected to the main filtration chamber in such a manner that the upper side peripheral wall of the main filtration chamber serves as a partition wall between the main filtration chamber and the return fuel chamber, a return pipe connected to the return fuel chamber for introducing fuel returning from the engine to the return fuel chamber, and a vapor discharging device provided to an upper side portion of a peripheral wall of the return fuel chamber for discharging vapor from the return fuel chamber.

According to a further aspect of the present invention, the return fuel chamber has a peripheral wall formed from sheet impermeable to fluid.

According to a further aspect of the present invention, the return fuel chamber has a peripheral wall formed from a meshed filter medium.

According to a further aspect of the present invention, a remaining peripheral wall of the main filtration chamber is formed from a meshed filter medium, and the meshed filter medium from which the upper side peripheral wall of the main filtration chamber is formed has larger meshes than the meshed filter mediums from which the remaining peripheral wall of the main filtration chamber and the peripheral wall of the return fuel chamber are formed.

According to a further aspect of the present invention, the upper side peripheral wall of the main filtration chamber is formed into a waved shape.

According to a further aspect of the present invention, only a bottom wall portion of the remaining peripheral wall of the main filtration chamber is multi-walled.

According to a further aspect of the present invention, the filter further comprises a framework disposed within the main filtration chamber for holding a predetermined shape of the main filtration chamber.

According to a further aspect of the present invention, the filter further comprises a framework disposed within the return fuel chamber for holding a predetermined shape of the return fuel chamber.

According to a further aspect of the present invention, there is provided a filter which is disposed within a fuel tank for use with an-in-tank fuel pump for an internal combustion engine and comprises a main filtration chamber connected to an inlet of the fuel pump and having a peripheral wall formed from a meshed filter medium, a return fuel chamber having a peripheral wall formed from sheet impermeable to fuel and vapor and connected to the main filtration chamber in such a manner that an upper side portion of the peripheral wall of the main filtration chamber serves as a partition wall between the main filtration chamber and the return fuel chamber, a return pipe connected to the return fuel chamber for introducing return fuel from the engine to the return fuel chamber, and a check valve provided to an upper side portion of the peripheral wall of the return fuel chamber for discharging vapor from the return fuel chamber.

According to a further aspect of the present invention there is provided a filter which is disposed within a fuel tank for use with an in-tank fuel pump for an internal combustion engine and comprises a main filtration chamber connected to an inlet of the fuel pump and having a peripheral wall formed from a meshed filter medium, a return fuel chamber having an upper side peripheral wall formed from a meshed filter medium and connected to the main filtration chamber in such a manner that the upper side peripheral wall of the main filtration chamber serves as a partition wall between the main filtration chamber and the return fuel chamber, a return pipe connected to the return fuel chamber for introducing return fuel from the engine to the return fuel chamber, and a check valve provided to an upper side portion of the peripheral wall of the return fuel chamber for discharging vapor from the return fuel chamber, wherein a remaining peripheral wall of the main filtration chamber is formed from a meshed filter medium, and the meshed filter medium from which the upper side peripheral wall of the main filtration chamber is formed has larger meshes than the meshed filter mediums from which the remaining peripheral wall of the main filtration chamber and the peripheral wall of the return fuel chamber are formed.

According to a further aspect of the present invention, there is provided a filter arrangement for an in-tank fuel pump for an internal combustion engine, which comprises a fuel tank having disposed therewithin a reservoir, a lid fitted in an upper open end of the reservoir, a fuel pump disposed inside the reservoir and connected to the engine, and a filter disposed inside the reservoir and having a main filtration chamber and a return fuel chamber. The main filtration chamber is connected to an inlet of said fuel pump and has a peripheral wall formed from a meshed filter medium. The return fuel chamber has a peripheral wall formed from sheet impermeable to fluid and connected to the main filtration chamber in such a manner that an upper side portion of the peripheral wall of the main filtration chamber serves as a partition wall between the main filtration chamber and the return fuel chamber. The filter arrangement further comprises a return pipe connected to the return fuel chamber for introducing return fuel from the engine to the return fuel chamber, and a check valve for discharging vapor from said return fuel chamber. The peripheral wall of the return fuel chamber is integral with the lid and having an upper end peripheral wall portion which is constituted by a portion the lid. The return pipe and the check valve are provided to the upper end peripheral wall portion of the return fuel chamber.

The above structure is effective for solving the above noted problems inherent in the prior device.

It is accordingly an object of the present invention to provide a novel and improved filter for a in-tank fuel pump for an internal combustion engine, which can assuredly separate vapor from return fuel before the return fuel is taken into the fuel pump for thereby preventing the performance characteristics of the engine from being deteriorated.

It is a further object of the present invention to provide a novel and improved filter of the above described character which can supply return fuel to the fuel pump with efficiency for thereby preventing substantial increase of the temperature of the fuel within the fuel tank.

It is a further object of the present invention to provide a novel and improved filter of the above described character which does not cause any decrease of the intake efficiency of the fuel pump at all.

It is a further object of the present invention to provide a novel and improved filter of the above described character which can be manufactured with ease and therefore at a low cost.

It is a further object of the present invention to provide a novel and improved filter of the above described character which can assuredly prevent deformation of itself and therefore deterioration of its intake efficiency caused thereby.

It is a further object of the present invention to provide a novel and improved filter of the above described character which can reduce the man-hour for its assembling and manufacturing as well as for control of its constituent parts for thereby reducing the manufacturing and assembling cost.

DETAILED DESCRIPTION OF THE PREFERRED EMBODIMENTS

Figure 1:
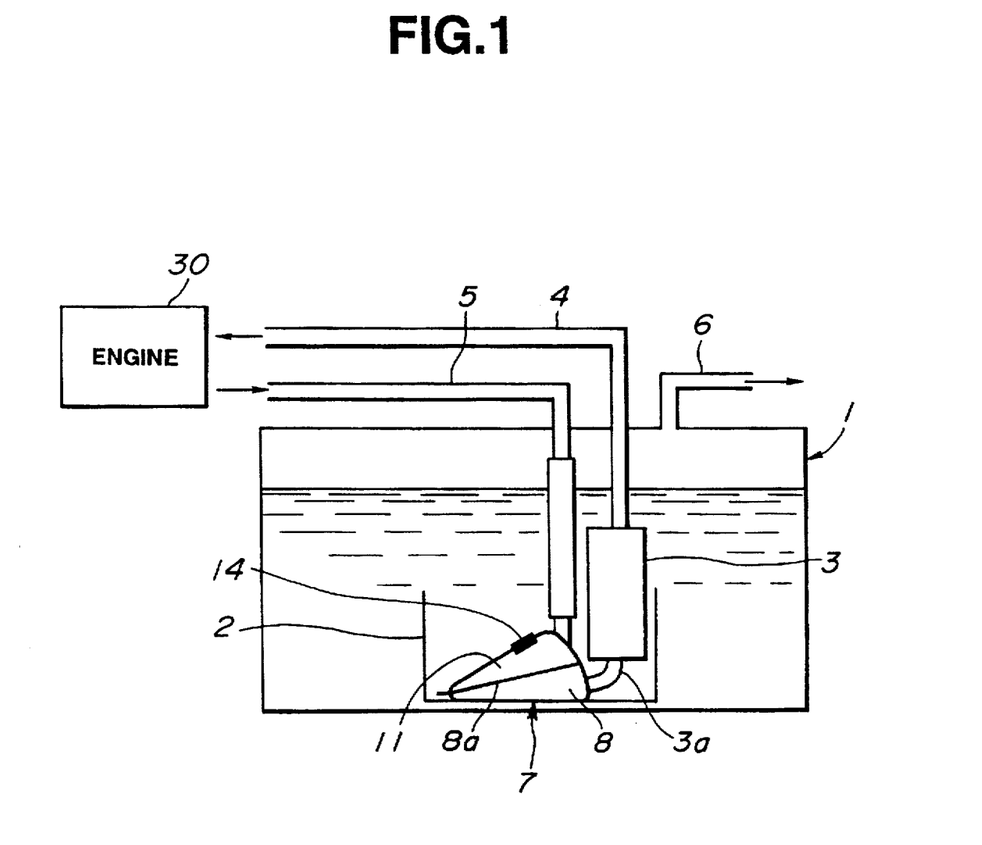
FIG. 1 is a schematic view of a filter for use with an in-tank fuel pump according to an embodiment of the present invention.
Figure 2:
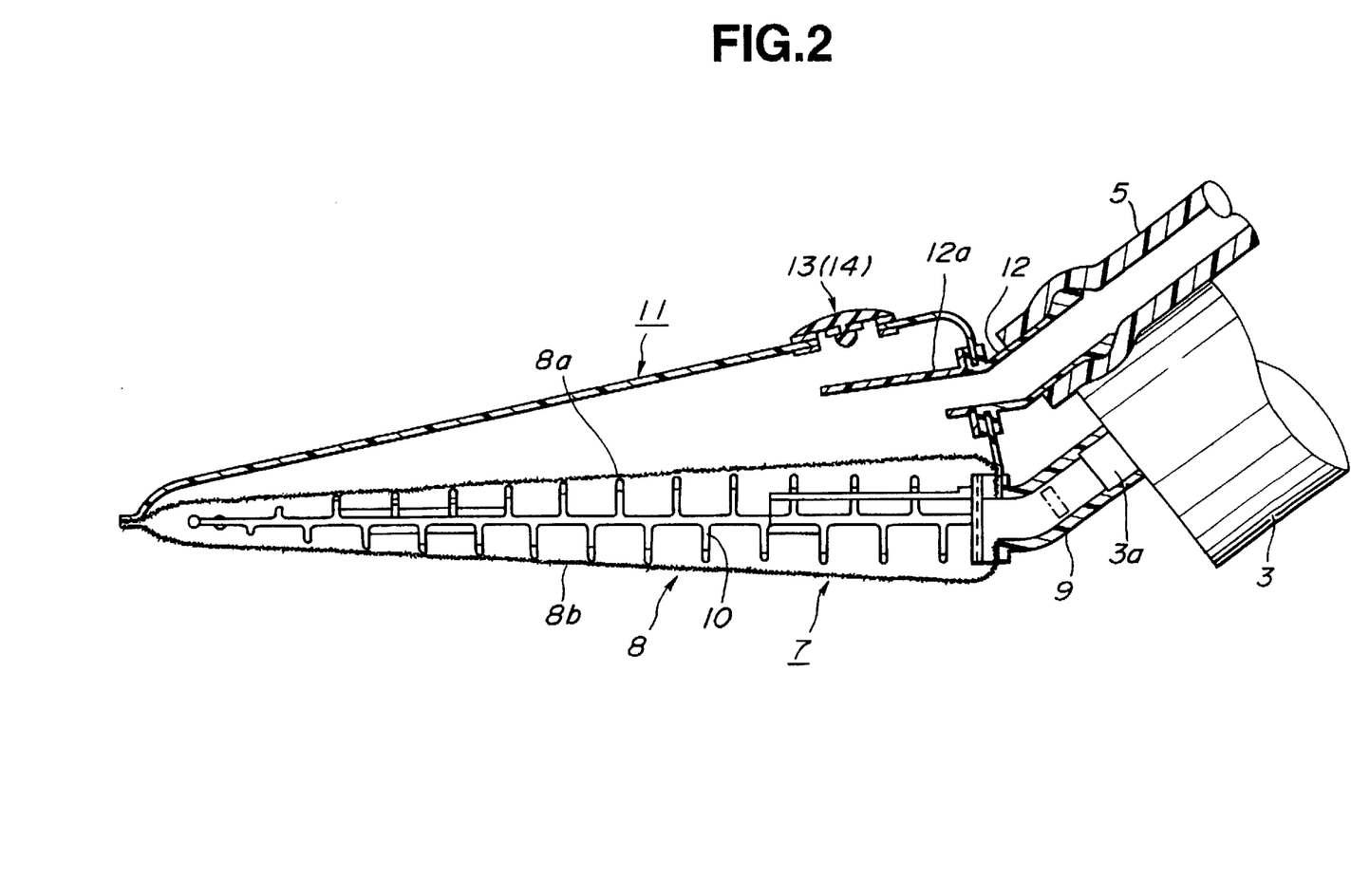
FIG. 2 is an enlarged, sectional view of the filter of FIG. 1.

Referring first to FIGS. 1 and 2, a fuel tank is generally indicated by 1 and includes a reservoir 2 disposed within the fuel tank 1 and positioned at the central portion of the bottom of the fuel tank 1. A fuel pump 3 is disposed within the reservoir 2.

The fuel within the fuel tank 1 is supplied from the fuel pump 3 through a feed pipe 4 to an engine 30. Excess fuel from the engine 30 is returned through a return pipe 5 to the reservoir 2.

A vapor outlet pipe 6 is connected to the upper wall of the fuel tank 1 so that vaporized fuel staying at an upper space within the fuel tank 1 is drawn through the vapor outlet pipe 6 and a constant pressure control valve (not shown) to a canister (not shown) when the pressure within the fuel tank 1 exceeds a predetermined value.

A filter 7 has a main filtration chamber 8 formed from a meshed filter medium of 80 μm meshes. The main filtration chamber 8 has a predetermined volume and is hydraulically connected through a connecting pipe 9 to an inlet 3a of the fuel pump 3. The inlet 3a is located at the lower end of the fuel pump 3.

A framework 10 is disposed within the main filtration chamber 8 for holding a predetermined shape of the main filtration chamber 8 and thereby preventing deterioration of a fuel intake efficiency due to deformation of the main filtration chamber 8. The main filtration chamber 8 is disposed so as to contact at the bottom thereof with the bottom of the reservoir 2.

The filter 7 further has a return fuel chamber 11 of a predetermined volume. The return fuel chamber 11 is disposed on the upper side of the main filtration chamber 8 in such a manner that an upper side peripheral wall 8a of the main filtration chamber 8 serves as a partition wall between the main filtration chamber 8 and the return fuel chamber 11.

The return fuel chamber 11 has a peripheral wall formed from plate or sheet impermeable to fluid, i.e., 10 impermeable to fuel and vapor. More specifically, the peripheral wall of the return fuel chamber 11 is formed from molded plate or sheet of a synthetic resinous material. The return fuel chamber 11 has connected thereto a connecting pipe 12 which is in turn connected to the return pipe 5.

The upper wall of the return fuel chamber 11 is provided with a vapor discharging device 13 for discharging vapor from the return fuel chamber 11. Specifically, the vapor discharging device 13 is constituted by a check valve 14 which is adapted to open when the pressure inside the return fuel chamber 11 increases beyond a predetermined value. A diffuser 12a in the form of a planar plate is disposed under the check valve 14 and connected to the peripheral wall of the return fuel chamber 11.

With the above structure, when return fuel from the engine 30 is drawn through the return pipe 5 into the return fuel chamber 11 located on the upper side of the main filtration chamber 8, the high temperature return fuel does not flow from the return fuel chamber 11 into the inside of the fuel tank 1 since the peripheral wall of the return fuel chamber 11 is formed from plate or sheet impermeable to fluid but flows into the main filtration chamber 8 through the upper side peripheral wall 8a of the main filtration chamber 8 formed from a meshed filter medium. The meshes of the meshed filter medium from which the upper side peripheral wall 8a is formed are always put in a closed condition due the surface tension of the fuel passing therethrough so as to block passage of the vapor mixed in the return fuel but allow passage of the return fuel from the return fuel chamber 11 to the main filtration chamber 8, whereby the vapor is completely separated from the return fuel by means of the upper side peripheral wall 8a of the main filtration chamber 8.

Accordingly, the return fuel from which vapor is separated by the upper side peripheral wall 8a of the main filtration chamber 8, is taken into the inlet 3a of the fuel pump 3 together with fuel within the fuel tank 1 which has passed through a remaining peripheral wall 8b of the main filtration chamber 8 (i.e., a side and bottom wall 8b of the main filtration chamber 8 except for the upper side wall 8a) and circulated to the engine 30.

Further, the vapor separated at the return fuel chamber 11 from the return fuel stays at the upper part of the return fuel chamber 11. When the pressure of the vapor staying at the upper part of the return fuel chamber 11 increases beyond a predetermined value to cause the check valve 14 to open, the vapor is discharged from the return fuel chamber 11 to be collected at the upper space within the fuel tank 1 and drawn through the vapor outlet pipe 6 and a constant pressure control valve (not shown) to a canister (not shown) when the pressure within the fuel tank 1 exceeds a predetermined value.

As a result, only the fuel part of the return fuel returned through the return pipe 5 is taken into the fuel pump 3 and circulated to the engine 30, thus not causing any deterioration of the performance characteristics of the engine 30 whilst making it possible to prevent substantial increase of the temperature of the inside of the fuel tank 1 due to the circulation of the return fuel to the engine 30.

Figure 3:
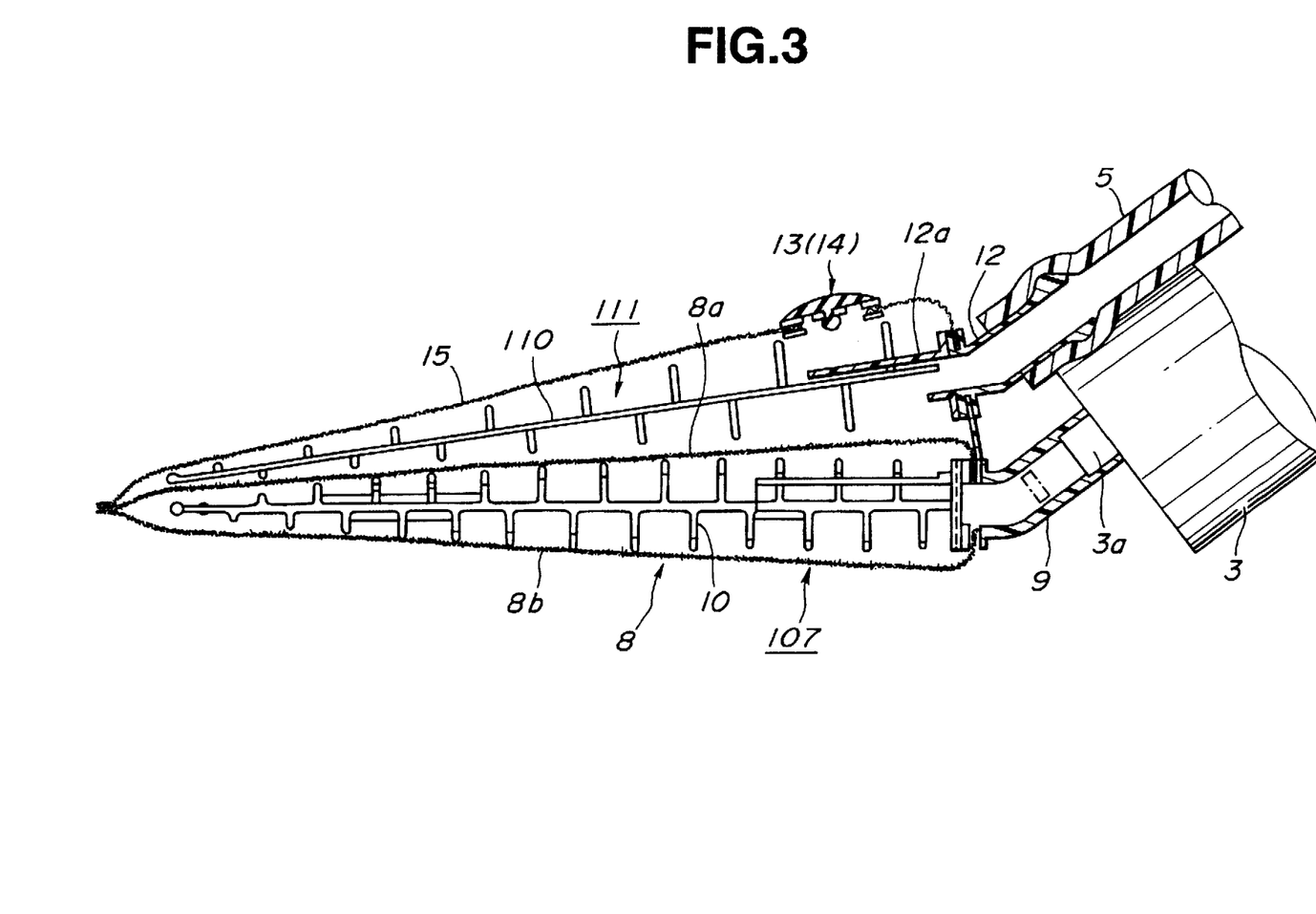
FIGS. 3 to 5 are views similar to FIG. 2 but show further embodiments.

FIG. 3 shows another embodiment in which the return fuel chamber 111 of the filter 107 is constructed so as to have a peripheral wall 15 formed from a meshed filter medium the meshes of which are, for example, 80 μm similarly to the meshed filter medium from which the main filtration chamber 8 is formed and have therewithin a framework 110 made of a synthetic resinous material for holding the shape of the return fuel chamber 111 and thereby preventing deterioration of the fuel intake efficiency due to the deformation of the return fuel chamber 111.

With this embodiment, the fuel within the fuel tank 1 is drawn through the peripheral wall 15 of the return fuel chamber 111 into the main filtration chamber 8 together with the return fuel so as to be taken into the inlet 3a of the fuel pump 3.

As a result, the provision of the return fuel chamber 111 on the upper side of the main filtration chamber 8 does not decrease the filtration area of the filter 7 and therefore does not decrease the fuel intake efficiency of the fuel pump 3 at all.

In this connection, the mesh openings of the meshed filter medium from which the upper side peripheral wall 8a of the main filtration chamber is formed, are set so as to be larger than the mesh openings (i.e., 80 μm) of the meshed filter medium from which the peripheral walls 8b and 15 are formed, for example, so as to be about 100 μm which borders on the ability of separating vapor from fuel. By this, it becomes possible to improve the intake permeability of the return fuel through the upper side wall 8a of the main filtration chamber 8 whilst assuredly preventing permeation and flow of the return fuel through the peripheral wall 15 of the return fuel chamber 111 into the fuel tank 1.

Figure 4:
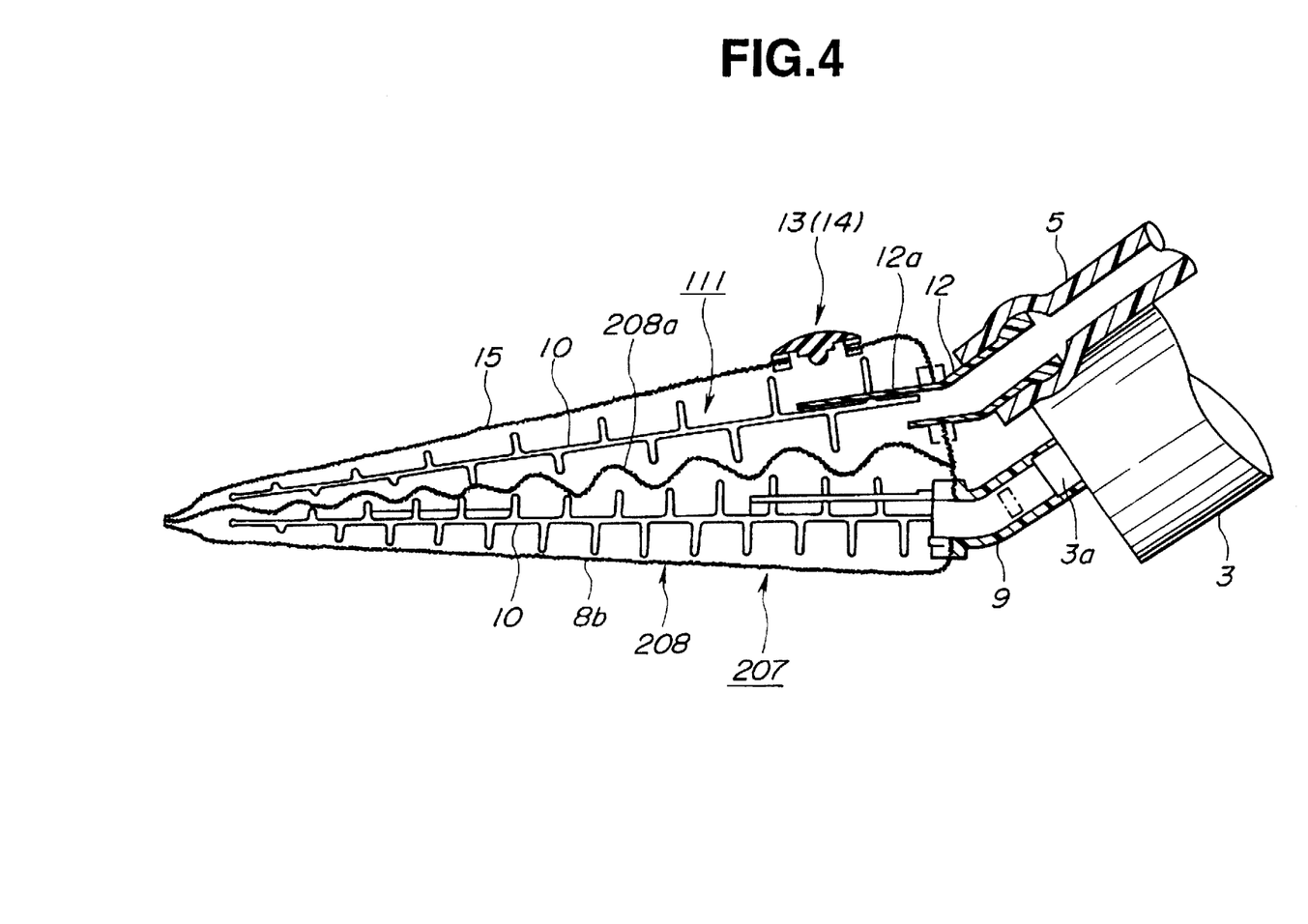

FIG. 4 shows a further embodiment in which in addition to that the peripheral wall 15 of the return fuel chamber 111 is formed from a meshed filter medium, the upper side peripheral wall 208a of the main filtration chamber 208 of the filter 207 is formed into a waved shape.

In this connection, the pressure inside the main filtration chamber 208 tends to become negative whilst the pressure inside the return fuel chamber 111 tends to become positive due to the operation of the fuel pump 3. With such a peripheral wall 208a having a waved shape, the return fuel can flow more easily from the return fuel chamber 111 to the main filtration chamber 208 due to the increased surface area of the upper side peripheral wall 208a, thus making it possible to attain the same effect as is attained by forming the upper side peripheral wall 208a from a meshed filter medium having larger meshes.

Further, since the upper side peripheral wall 208a has a diaphragm effect due to its waved shape, it becomes possible for the return fuel chamber 111 to change its volume in response to a variation of the flow rate of return fuel with ease.

In this embodiment, it is needless to say that the meshes of the meshed filter medium from which the upper side peripheral wall 208a is formed can be larger than those of the meshed filter medium from which other peripheral walls 8b and 15 are formed.

Figure 5:
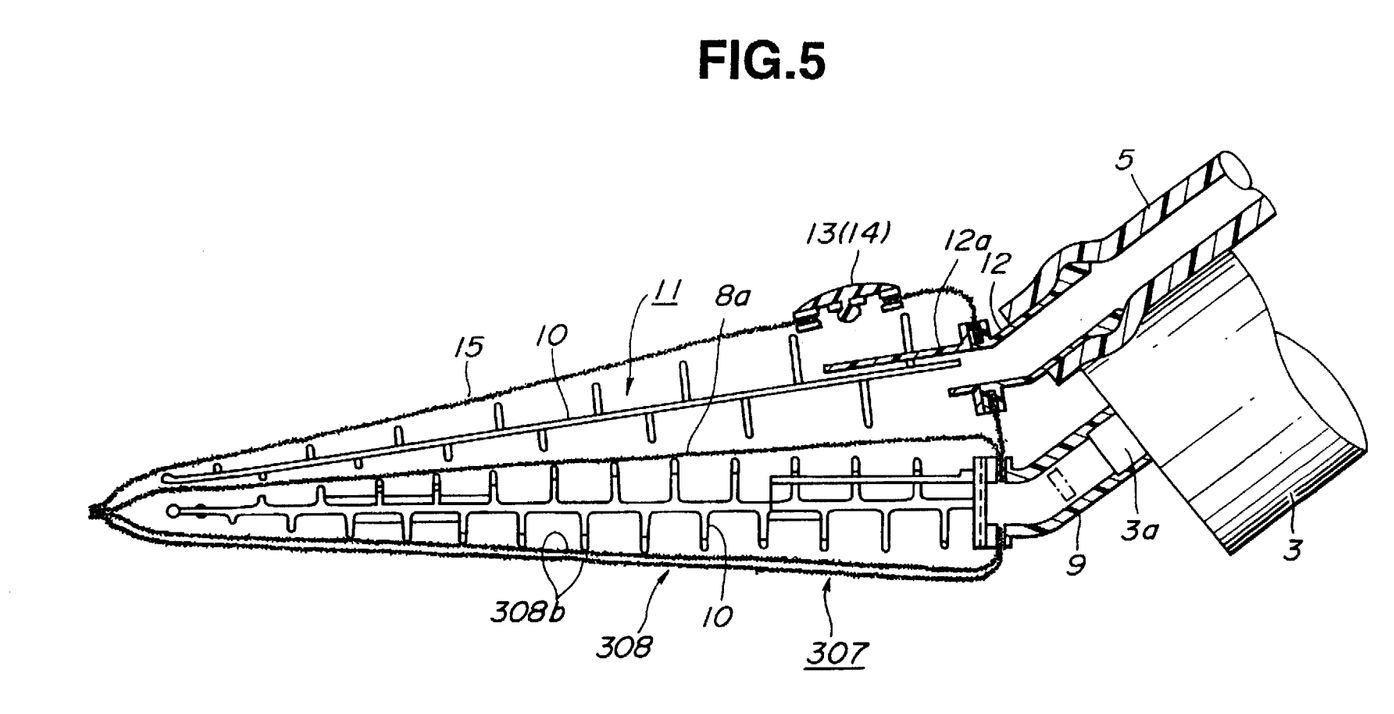

FIG. 5 shows a further embodiment in which only the bottom portion of the peripheral wall 308b of the main filtration chamber 308 in sliding contact with the reservoir 2 is constructed so as to be dual-walled as shown or multi-walled. With this embodiment, it becomes possible to prevent the bottom portion of the main filtration chamber 308 of the filter 307 from being damaged due to rubbing of the bottom of the main filtration chamber 308 against the bottom of the reservoir 2.

Figure 6:
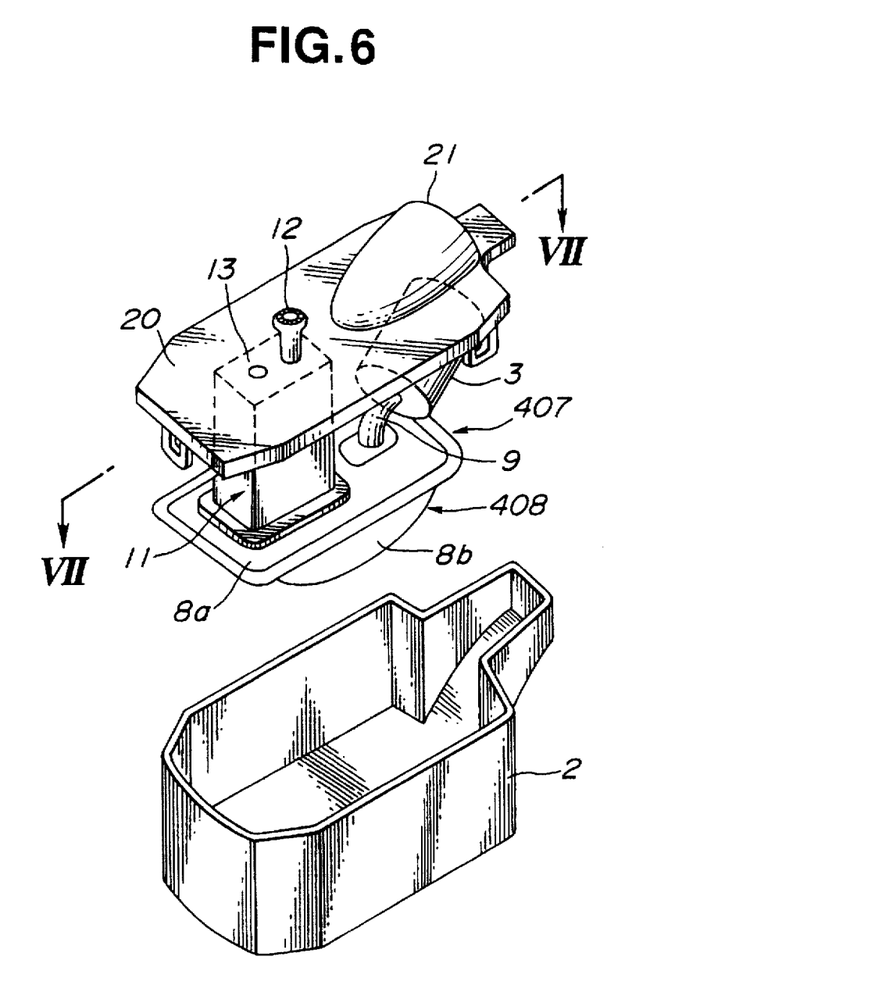
FIG. 6 is a perspective, partly exploded view of a further embodiment of the present invention.
Figure 7:
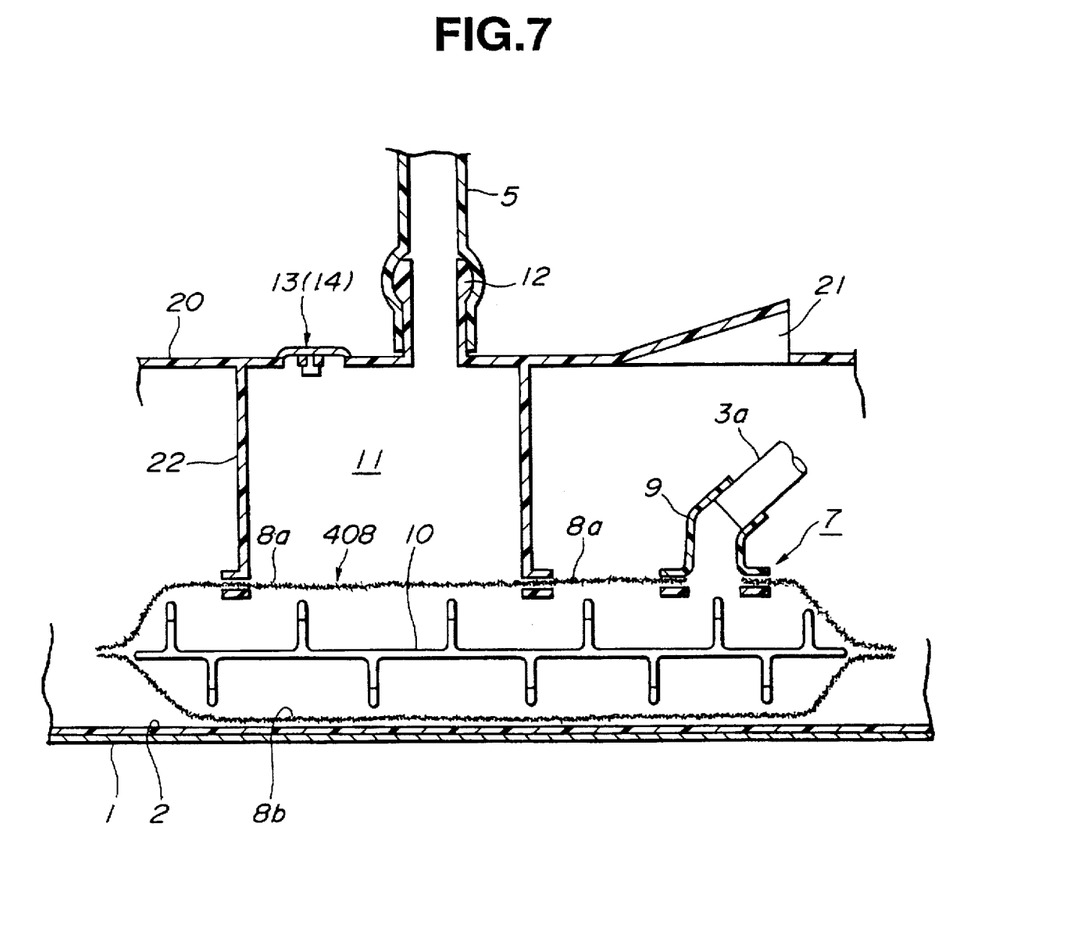
FIG. 7 is a sectional view taken along the line VII—VII of FIG. 6.

FIGS. 6 and 7 show a further embodiment in which the main filtration chamber 408 and the return fuel chamber 411 of the filter 407 are attached to a lid 20 for the reservoir 2 so as to constitute an integral unit.

The lid 20 is adapted to be fitted in and fixed to the upper open end of the reservoir 2. The lid 20 has an fuel inlet opening 21 and an integral tubular wall 22 protruding downward therefrom. The lower end of the tubular wall 22 is fused to the upper side wall 408a of the main filtration chamber 408, whereby a return fuel chamber 411 of a predetermined volume is formed by using the upper side peripheral wall 408a of the main filtration chamber 408 as a partition wall between the return fuel chamber 411 and the main filtration chamber 408.

The connecting pipe 12 for connection to the return pipe 5 and the vapor discharging device 13 are provided to a portion of the lid 20 constituting the upper wall of the return fuel chamber 411.

With this embodiment, the main filtration chamber 408 and the return fuel chamber 411 of the filter 407 are attached to the lid 20 so as to constitute an integral unit. The main filtration chamber 408 and the return fuel chamber 411 of the filter 407 can thus be fixedly held within the reservoir 2 by installing the lid 20 on the reservoir 2, thus making it possible to reduce the man-hour for management of parts considerably.

While the tubular wall 22 of the lid 20 constituting the peripheral wall of the return fuel chamber 11 is shown as being formed from molded plate or sheet of a synthetic resinous material integral with the lid 20, this may be formed from a meshed filter medium as described with respect to the embodiments of FIGS. 3 to 5.

From the foregoing, it will be understood that the present invention can produce the following effects.

(1) High temperature return fuel returned through the return pipe to the return fuel chamber on the upper side of the main filtration chamber of the filter can be taken into the fuel pump for recirculation to the engine after being completely separated from vapor by means of a meshed filter medium forming the upper side peripheral wall of the main filtration chamber and serving as a partition wall between the return fuel chamber and the main filtration chamber, thus making it possible to prevent circulation of the return fuel to the engine from causing deterioration of the performance characteristics of the engine and increase of the temperature of the fuel within the fuel tank.

(2) By forming the peripheral wall of the return fuel chamber from plate or sheet impermeable to fluid, it becomes possible to prevent the high temperature return fuel returned to the return fuel chamber from flowing from the return fuel chamber into the fuel tank to cause the temperature of the fuel within the fuel tank to rise.

(3) By forming the peripheral wall of the return fuel chamber from a meshed filter medium, the fuel within the fuel tank is caused to flow, through the meshed filter medium forming the peripheral wall of the return fuel chamber and by way of the return fuel chamber, into the main filtration chamber together with the return fuel, thus not reducing the filtration area of the main filtration chamber and not lowering the fuel intake efficiency of the fuel pump at all.

(4) By forming a remaining peripheral wall of the return fuel chamber (i.e., the peripheral wall of the return fuel chamber except for a portion formed by the upper side peripheral wall of the main filtration chamber) from a meshed filter medium and setting the meshed filter medium forming the upper side peripheral wall of the main filtration chamber to be of the meshes larger than those of the meshed filter medium forming the remaining peripheral wall of the return fuel chamber, it becomes possible to retain a good fuel intake efficiency of the fuel pump and improve the intake permeability of return fuel from the return fuel chamber to the main filtration chamber, thus making it possible to prevent permeation and flow of return fuel from the return fuel chamber to the inside of the fuel tank through the meshed filter medium forming the peripheral wall of the return fuel chamber.

(5) By forming the peripheral wall of the return fuel chamber from a meshed filter medium and forming the meshed filter medium constituting a partition wall between the return fuel chamber and the main filtration chamber into a waved shape, it becomes possible to obtain the same effect as is obtained by the use of a meshed filter medium of larger meshes, thus making it possible to increase the permeability of the partition wall between return fuel chamber and the main filtration chamber without changing the meshes of the meshed filter medium and therefore making it possible to improve the productivity.

Further, by the waved shape the partition wall between the return fuel chamber and the main filtration chamber can produce a diaphragm effect, thus making it possible to change the volume of the return fuel chamber with ease in response to a variation of the flow rate of the return fuel and therefore making it possible to prevent flow of return fuel from the return fuel chamber to the inside of the fuel tank due to an increased flow rate of return fuel.

(6) By forming the peripheral wall of the return fuel chamber from a meshed filter medium and forming only the bottom of the main filtration chamber in such a manner as to be dual-walled or multi-walled, the fuel within the fuel tank can also be drawn through the peripheral wall of the return fuel chamber to improve the fuel intake efficiency whilst and the bottom of the main filtration chamber in contact with the reservoir can attain an improved durability.

(7) Since the framework is disposed within the filter for holding the shape thereof, it becomes possible to prevent deterioration of the fuel intake efficiency due to deformation of the filer.

(8) By forming the main filtration chamber and the return fuel chamber in such a manner as to constitute an integral unit together with the upper lid of the rotary tub, it becomes possible to dispose the filter main body and the return fuel chamber fixedly within the rotary tub, thus making it possible to reduce the man-hour for management of parts for thereby reducing the cost.

What is claim is:

1. A filter for an in-tank fuel pump for an internal combustion engine, comprising:

a main filtration chamber adapted to be connected to an inlet of the fuel pump and having an upper peripheral wall formed from a meshed filter medium;

a return fuel chamber communicating with said main filtration chamber and having an upper peripheral wall formed of a mesh filter medium, wherein said upper peripheral wall of said main filtration chamber serves as a partition wall partitioning said main filtration chamber and said return fuel chamber;

a return pipe adapted to be connected to said return fuel chamber for introducing fuel returning from the engine to said return fuel chamber; and a vapor discharging device provided at an upper portion of said upper peripheral wall of said return fuel chamber for discharging vapor from said return fuel chamber, wherein the meshed filter medium forming said upper peripheral wall of said main filtration chamber has a wave configuration to increase a surface area in said partition wall to thereby increase flow to said main filtration chamber from said return fuel chamber, and wherein said meshed filter medium forming said upper peripheral wall of said main filtration chamber is adapted to separate vapor from fuel flowing therethrough from said return fuel chamber into said main filtration chamber.

2. A filter according to claim 1, further comprising a framework disposed within said main filtration chamber for holding a predetermined shape of said main filtration chamber.

3. A filter according to claim 1, further comprising a framework disposed within said return fuel chamber for holding a predetermined shape of said return fuel chamber.

4. A filter according to claim 1, wherein said main filtration chamber is further defined by bottom and side peripheral walls formed from a meshed filter medium.

5. A filter according to claim 4, wherein said meshed filter medium of said upper peripheral wall of said main filtration chamber, said meshed filter media of said bottom and side peripheral walls of said main filtration chamber, and said meshed filter medium of said upper peripheral wall of said return fuel chamber are formed of the same filter medium.

6. A filter according to claim 4, wherein said meshed filter medium of said upper peripheral wall of said main filtration chamber has larger mesh openings than those of said meshed filter media of said bottom and side peripheral walls of said main filtration chamber and said upper peripheral walls of said return fuel chamber.

* * * * *